Nov. 18, 1952  C. P. VAN DIJK ET AL  2,618,626
PROCESS OF POLYMERIZING OLEFINICALLY UNSATURATED COMPOUNDS
Filed Dec. 19, 1950  2 SHEETS—SHEET 1
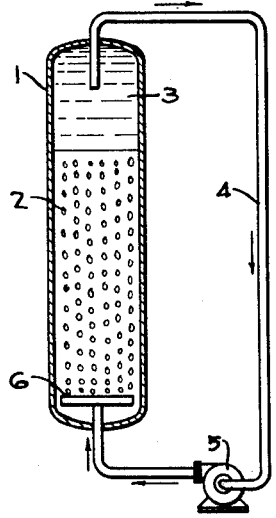
FIG. I
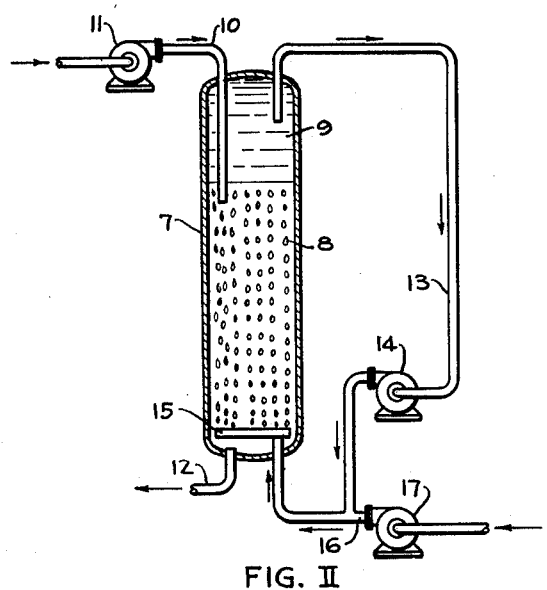
FIG. II
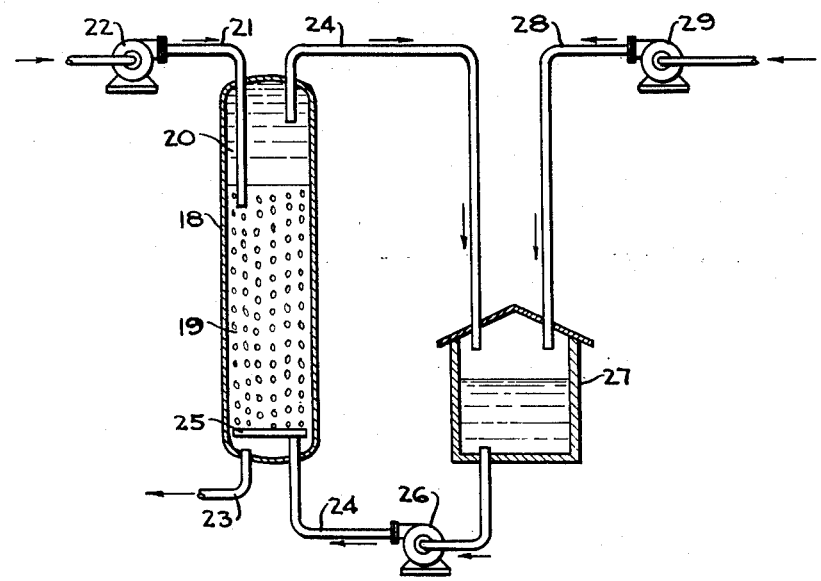
FIG. III
Inventors:
Christiaan P. Van Dijk
Franciscus J.F. Van Der Plas
By: James H. Parker
Their Attorney Nov. 18, 1952                C. P. VAN DIJK ET AL                    2,618,626
             PROCESS OF POLYMERIZING OLEFINICALLY UNSATURATED COMPOUNDS
Filed Dec. 19, 1950                                              2 SHEETS—SHEET 2
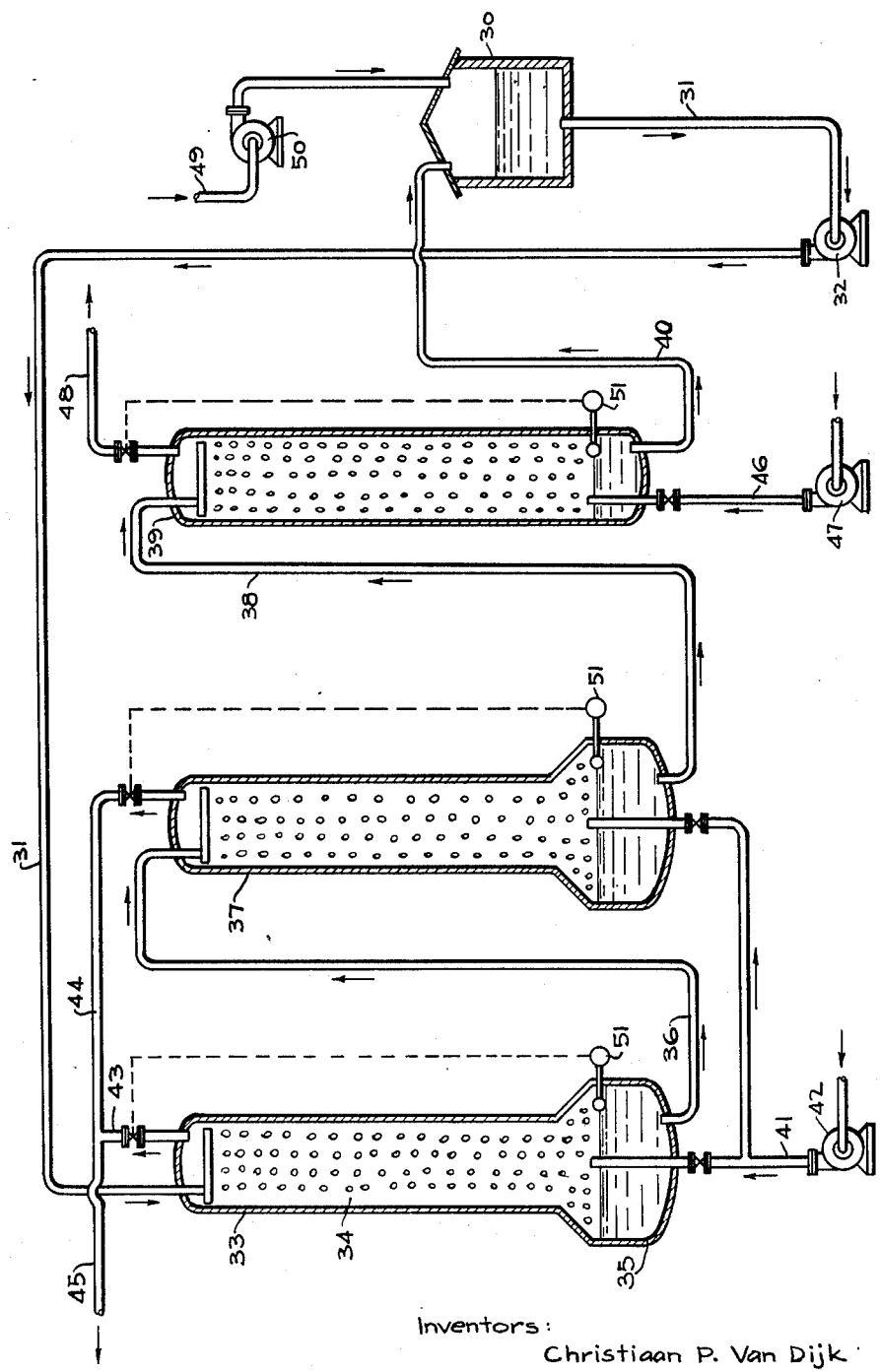
FIG. IV
Inventors:
Christiaan P. Van Dijk
Franciscus J.F. Van Der Plas
By: James A. Parker
    Their Attorney Patented Nov. 18, 1952

2,618,626

UNITED STATES PATENT OFFICE 2,618,626

PROCESS OF POLYMERIZING OLEFINICALLY UNSATURATED COMPOUNDS

Christiaan Pieter van Dijk and Franciscus Johannes Fredericus van der Plas, Amsterdam, Netherlands, assignors to Shell Development Company, San Francisco, Calif., a corporation of Delaware Application December 19, 1950, Serial No. 201,536
In the Netherlands December 27, 1949

23 Claims. (Cl. 260—82.3)

This invention relates to a process of polymerizing olefinically unsaturated compounds More particularly, the invention is concerned with a method of polymerizing in an aqueous medium an olefinically unsaturated compound which is not or only partially miscible with water. Still more particularly, the invention is concerned with a method of polymerizing in an aqueous medium, in the presence of an emulsifier, an olefinically unsaturated compound which is not or only partially miscible with water.

Processes for the polymerization of olefinically unsaturated compounds in an aqueous medium in the presence of an emulsifier are known in the art. Such known processes, however, are liable to various drawbacks. A vigorous agitation in those processes is necessary, which as a rule is performed by means of mechanical stirrers. The vigorous agitation may cause the polymer to coagulate. Therefore when stable polymer dispersions are desired such coagulation must be avoided by the maintenance of high emulgator concentrations. A further difficulty encountered in the known polymerization methods is caused by the highly exothermic character of the polymerization reactions. In view of the limited cooling capacity of the apparatus used, the conditions of polymerization must be chosen in such a way that certain limits in the rate of polymerization cannot be surpassed.

It is an object of the present invention to provide a process for the polymerization in an aqueous medium, of olefinically unsaturated compounds which are not or only partially miscible with water, in the presence of an emulsifier but without making use of mechanical stirring devices.

It is an other object of the invention to provide a process for the polymerization in an aqueous medium, of olefinically unsaturated compounds which are not or only partially miscible with water, to form stable polymer suspensions whilst using only small emulsifier concentrations.

It is still another object of the invention to provide a process for the polymerization in an aqueous medium, of olefinically unsaturated compounds which are not or only partially miscible with water, in which process coagulation or deposits of polymer are avoided.

It is a further object of the invention to provide a process for the polymerization in an aqueous medium, of olefinically unsaturated compounds which are not or only partially miscible with water, which process offers an improved opportunity for removal of heat, involving higher rates of polymerization to be allowed.

It is a still further object of the invention to provide a process for the polymerization in an aqueous medium, of olefinically unsaturated compounds which are not or only partially miscible with water, which process is easily run with efficient removal of heat at low polymerization temperatures.

Another object of the invention is to provide an effective method for the preparation of homogeneous copolymers.

Still another object of the invention is to provide a continuous process for the preparation of heterogeneous copolymers the composition of which during the process may be varied at will.

A further object of the invention is to provide a process for the polymerization in an aqueous medium, of olefinically unsaturated compounds which are not or only partially miscible with water, which process has the advantage of easy operability and offers excellent opportunity of automatisation.

Still further objects of the invention will become apparent as this specification proceeds.

According to the process of the invention, drops of monomer of an olefinically unsaturated compound are introduced into submerged contact with a liquid aqueous medium containing a polymerization catalyst and an emulsifying agent, and the drops are conducted through the aqueous medium, the movement of drops through the medium being effected by and due to a difference in density of the drops and the medium. If the liquid monomer is lighter than the aqueous phase, the drops flow upwards by reason of the buoyancy of the drops in the aqueous medium. Similarly, if the drops are heavier than the aqueous phase, the drops flow downwards. The polymerization product appears as a suspension of polymer in the aqueous phase.

The process of the invention is essentially an emulsion polymerization process, that is to say a polymerization process carried out in the presence of an aqueous phase containing an emulsifier and moreover in the presence of a catalyst or catalyst system yielding radicals in said aqueous phase. The present process is, however, distinctly different from the well known method of effecting polymerization with monomer of an unsaturated compound in emulsified condition in an aqueous medium. In the method of the invention, the drops of monomer are conducted in unemulsified condition through the aqueous medium, and while in contact therewith, a minor proportion of the monomer diffuses from the drops into the water phase to be subsequently converted to polymer. This operation is achieved by allowing the drops to flow through the medium without use, at least to appreciable extent, of mechanically induced agitation. Thus instead of the monomer being broken up into minute globules in the form of an emulsion by stirring, shearing, or the like, as in prior methods, the present process adopts the procedure of avoiding emulsification of the monomer in the aqueous medium. It thereby permits the monomer while still existing as drops to flow through the aqueous medium by the floating or sinking forces from the difference in density of the drops and the medium.

The process of the invention is conveniently effected in a reaction chamber which is in the form of a vertical column. The column is nearly filled with the aqueous medium and the monomeric compound is introduced into contact therewith as drops with the aid of an entering means which is preferably a distributing device containing a plurality of apertures through which the monomer enters into contact with the aqueous medium. The entrance aperture or apertures can have a diameter of say 0.2–20 mm. and are usually 2 to 10 mm. The entering means is placed at one end of the reaction chamber so that the drops flow away from it. At the opposite end, the drops which have passed clear through the aqueous phase are collected into an integral monomer phase which is preferably maintained as a layer in contact with the aqueous phase. The rate of separation of the drops into the monomer phase from the aqueous phase increases with the area of the interface between the two phases. It is, therefore, generally desirable to have the interface positioned in the reaction chamber at a point of largest cross-sectional area. This can be achieved in a column-shaped reaction chamber by having the chamber fitted with a region of enlarged cross-section which is perpendicular to the axis of flow of drops. This enlarged portion will be located either at the top or bottom of the main column, as the case may require. The separation of the two phases may also be carried out in a separation chamber of adequate cross-sectional area which is apart from the reaction chamber.

Although generally a column-shaped reaction chamber is preferred, the process may also be carried out in a reaction space the horizontal dimensions of which are larger than its height.

As in executing the process of the invention an important part (often, if not a column of water phase of considerable height is used, the majority) of the monomer in the drops passes through the aqueous phase without being diffused and collects in the integral monomer phase, it is almost always desirable to circulate monomer from the integral phase back to the point of introduction. Preferably the recirculation conduit is arranged outside the reaction chamber but it may also be arranged inside the reaction chamber. Even if the proportion of monomer diffused into the water phase in a single passage of the drops through the aqueous medium is very low, the process of the invention has been found to be very practical. In general, a predominant majority of more than 90% of monomer is not diffused into the water phase in one passage of drops through the aqueous phase. Usually the conversion of monomer to polymer per pass may amount to only about 0.03 to 5% per pass. Nevertheless, the invention provides a very simple and economical process for effecting polymerization. The procedure of circulating monomer through the aqueous medium is readily accomplished by pumping, and the apparatus as a whole is not complicated. As the cooling of the monomer circulating externally of the zone of polymerization offers a splendid opportunity for heat control very high rates of production of polymer per volume of aqueous medium may be allowed. In fact, the rate is often higher than that of the usual aqueous emulsion processes known heretofore. Production rates up to 75 to 300 grams of polymer per litre of aqueous phase per hour are realized with the present process.

In starting up the process when the aqueous phase contains little or no polymer, the flow of monomer drops therethrough gives rise to formation of a layer of concentrated emulsion at the interface of separation between the aqueous phase and monomer layer. Upon continuing the operation until the aqueous phase contains an appreciable proportion of emulsified polymer, e. g. 1% or more, the concentrated emulsion layer practically disappears. To avoid considerable growth of the concentrated emulsion layer at the start, it is desirable to keep the initial rate of introduction of monomer drops comparatively low. When the concentrated emulsion layer has been reduced on account of formation of polymer, the rate of introduction of monomer can be increased. To facilitate operation of the process in this early stage, it can be started up with use of an aqueous phase containing some emulsified polymer prepared beforehand.

The invention will be better understood by considering the accompanying drawings wherein Figs. I, II, III and IV are diagrammatic representations of several embodiments of the process.

One of the simple forms of the process is illustrated in Fig. I. Column-shaped reaction chamber 1 is largely filled with aqueous phase 2 containing a polymerization catalyst and an emulsifying agent. Over the aqueous phase is a layer 3 of separated liquid monomer, it being assumed in this case that the density of the liquid monomer is less than that of the aqueous phase. The monomer is circulated through conduit or line 4 by pump 5 to distributing device 6, from which device it moves upwards in coarse drops through the aqueous phase. In the case where the monomer is heavier than the water phase, distributing device 6 is fitted in the top section of the reaction chamber, monomer layer 3 separates beneath the aqueous phase, and the direction of flow through pump 5 is reversed so that monomer flows from bottom to top in line 4.

The embodiment illustrated in Fig. I involves production of a batch of polymer dispersion. More preferable is an embodiment wherein aqueous polymer dispersion is withdrawn from the polymerization zone of the reactor while feeding in fresh aqueous phase. In order that the volume of aqueous phase in the reactor will be maintained substantially constant, the input of fresh aqueous phase is kept balanced with the withdrawal of aqueous polymer dispersion. Moreover, the concentrations of polymerization catalyst and emulsifying agent are preferably maintained substantially constant in the aqueous phase contained in the polymerization zone by adding fresh quantities. This is conveniently accomplished with use as feed of a stock supply of aqueous phase which contains the polymerization catalyst and emulsifying agent. If desired, however, one or both of these auxiliary constituents can be added separately from the aqueous feed. Best results are achieved by having the place or places of withdrawal of aqueous polymer dispersion located in a region free of moving monomer drops such as at the side of the reactor, which may be behind a shield, or more preferably, in an end region behind the monomer distributing device which is located somewhat removed from end of the reactor opposite the monomer phase collecting region.

This embodiment of the process is illustrated in Fig. II wherein it is again assumed that the monomer drops are lighter and have lesser density than the aqueous phase. Column-shaped reaction chamber 7 is largely filled with aqueous phase 8 over which is a layer of separated monomer 9. The monomer collected in layer 9 is circulated through line 13 by pump 14 to distributing arrangement 15 from which it rises in aqueous phase 8 as coarse drops. Fresh aqueous phase containing polymerization catalyst and emulsifying agent is fed through line 10 by pump 11, and formed aqueous polymer dispersion is withdrawn behind distributing device 15 via line 12. The monomer consumed by the polymerization reaction is replenished intermittently or continuously through line 16 by pump 17. The introduction and withdrawal of aqueous phase may likewise be effected intermittently or continuously.

The process of the invention presents many advantages.

Since use of stirring devices within the reaction chamber is superfluous, the apparatus is simple, cheap and easy to clean. The movement of the monomer drops through the aqueous medium is effected primarily by the floating or sinking force resulting from the difference in density of the drops and the medium. Although the monomer drops receive a slight impetus of movement by pumping the monomer into contact with the aqueous phase, their movement is primarily due to the effect of difference in density. The aqueous medium may thus be free of mechanically induced agitation from use of stirrers or the like. Accordingly, the aqueous phase is free of agitation other than that induced by the moving drops and the liquids flowing in and out of the polymerizing zone.

Deposits of polymer on the equipment of previously known polymerization methods are generally caused by the shearing tensions due to mechanical stirring employed therein. Such deposits are very troublesome in necessitating frequent cleaning of reactor equipment with non-productive delays, cleaning costs, and loss from the polymer deposit which is ordinarily of little value. In the present process, little if any polymer deposit occurs. The stability of the polymer is governed within practical limits by the concentration of emulsifying agent. It is desirable to employ such a concentration of emulsifying agent that the aqueous suspension of polymer is substantially stable. This minimum desirable concentration is quite low, and with equal concentrations of emulsifier, the tendency towards settlement of polymer in the present process is less than previously known processes involving stirring.

The circulation of substantially pure monomer externally from the zone of polymerization in the present process affords good opportunity for heat control of the polymerization in a very simple and efficient manner. In prior processes where there is no external circulation, temperature control of the polymerization zone is a difficult problem because of the limitation of being able to cool only through the wall of the reaction space. The present process permits use of coolers having as large a cooling surface as desired and therefore large quantities of heat may be removed without difficulty. This feature or embodiment allows rates of polymerization to be achieved which were not possible with prior methods.

Cooling of the monomer in the circulation line is also of great importance when it is desired to effect polymerization in the present process with the temperature of the aqueous phase in the polymerizing zone in the vicinity of 0° C. or lower.

Cooling solely through the wall of the reaction vessel, as applied in the known processes, is effective only when the temperature of the cooling agent is much lower than the temperature in the reaction space. In this case ice will deposit on the wall, unless so much anti-freezing agent is added that the freezing point drops below the temperature of the cooling agent. In the known processes the quantity of anti-freezing agent added may amount to 50% or more of the quantity of water phase. Anti-freezing agents which may be added in the quantity mentioned are e. g. methanol, ethanol, glycerine, ethylene glycol or the like.

In the process of the invention on the contrary, when cooling the monomer in the circulation line, it is easy to maintain a recycle rate such that the difference in temperature between the reaction space and the monomer entering the reaction space need only be small. Consequently, when polymerizing at a temperature below zero, the amount of anti-freezing agent required to avoid ice formation, according to the present invention, is much lower than when cooling through the wall. With polymerization temperatures little higher than the freezing point of the waterphase it may be possible even to dispense entirely with the use of an anti-freezing agent.

Though not generally advisable, the temperature of the polymerizing zone may be regulated and maintained substantially constant by withdrawing a portion of the aqueous phase, subjecting it to cooling, and re-introducing the cooled material back with the aqueous phase. Cooling the circulating monomer is a far better procedure.

It is often advantageous to subject the circulating monomer to a washing operation before returning it as drops to the polymerization zone. For this purpose, washing with water gives good results and is easily effected by bringing monomer drops into contact with a column of water, conducting the drops through the water, and collecting the passed drops in an integral monomer layer for transportation to the polymerizing reactor. Washing the monomer in the circuit ahead of the circulating pump is preferred.

The size of the monomer drops moving through the aqueous medium in the process of the invention is decidedly larger than that of the minute monomer globules used in previously known emulsion polymerization processes employing mechanical agitation for preparation of the emulsion. In such emulsion processes, the monomer globules generally have a diameter of about one to ten microns and are of such small size as to be subject to Brownian movement.

In the present process, the monomer drops are much larger in usually being of about 0.1 to 1 centimeter in diameter. In all case, the movement of the monomer drops is caused primarily by the floating or sinking effect from the difference in density of the drops and the aqueous medium, and the size of the drops is so large that they are free of Brownian movement.

Although some variety in the internal diameter of the nozzles is allowed, this diameter is preferably so chosen that the linear velocity of the monomer when entering through the nozzle into the waterphase is not more than 30 cm. per second, more preferably not more than 12 cm. per second. Increase of the linear speed beyond 30 cm. per second may decrease the size of the drops and impair the uniformity of the monomer drops and consequently also impair the rate at which the monomer drops separate from the waterphase and join to integral monomer phase. The number of nozzles preferably is so chosen that at the required rate of monomer recirculation the linear speed in the nozzles is under the limits mentioned.

The process of the invention makes use of drops of monomer which rise or sink while in contact with the aqueous medium. Since the monomer is present as drops, it necessarily follows that the monomer is liquid. The present process thus differs from a prior method wherein fine bubbles of monomer vapour are floated upwards in contact with an aqueous medium, the vaporous monomer being present in such finely dispersed condition that most of the gaseous monomer is polymerized before reaching the surface of the liquid by introducing the vapour through such things as glass filters or kieselguhr filter candles. In the present process, usually only a very minor proportion of the monomer is converted to polymer in a single passage through the aqueous medium. Nevertheless, efficient production of polymer is attainable in the present process by circulation of the monomer repeatedly through the aqueous medium. In this manner, circulation is continued until the aqueous medium contains up to an appreciable amount, say 10% or 20% or higher percentages, e. g. 40–50% of dispersed polymer.

The method of the invention is excellently suited for manufacture of polymers and copolymers of vinyl chloride, vinylidene chloride and butadiene but it can be employed as well to effect polymerization of any polymerizable olefinically unsaturated compound capable of existing as a drop in contact with the aqueous medium. Generally speaking, the present invention is advantageous in the polymerization of substances which may be polymerized by the known methods of emulsion polymerization, i. e. the polymerization methods carried out in the presence of an aqueous phase and an emulsifier and in which the reaction is started by formation of radicals in the aqueous phase. In general, monomer of the compound is substantially insoluble in the aqueous medium, as is the case with such suitable compounds as vinyl halides like vinyl chloride or bromide; vinyl esters such as vinyl acetate, propionate or butyrate; halogenated ethylenes such as tetrafluoroethylene, chlorotrifluoroethylene, vinylidene chloride or bromide; vinyl aromatics like styrene, methyl styrene, divinyl benzene or chlorostyrene; acrylate and methacrylate esters such as methyl, ethyl or butyl acrylate or methacrylate; vinyl ketones like methyl vinyl or isopropenyl ketone; olefins such as ethylene, propylene, butadiene-1,3, isoprene, or chloroprene; olefinically unsaturated esters like crotyl acetate, oleyl acetate, diallyl phthalate, diallyl maleate or ethylene glycol dimethacrylate; and similar compounds, as well as homologues. Preferably, a vinylidene compound is used which contains the group $CH_2=C<$ as is present in vinylidene chloride, methyl acrylate, vinyl chloride, butadiene-1,3 and styrene. The process enables production of excellent copolymers by polymerizing a mixture of olefinically unsaturated compounds, such as styrene with butadiene-1,3 present in a weight ratio of about 1:9 to 4:6 of the first to the second. In general, there is used a mixture of polymerizable, olefinically unsaturated compounds wherein at least 1% of each is present in the drops for preparation of copolymers.

Any of the various polymerization catalysts known to be suitable for use in polymerizing olefinically unsaturated compounds in an aqueous system is employed. The catalyst is used in amounts up to about 5% usually between 0.1 and 1%, these percentages being by weight and based upon the aqueous phase. Water-soluble peroxy polymerization catalysts, such as hydrogen peroxide, sodium or potassium persulphate, percarbonate or perborate and tertiary butyl hydroperoxide, are very useful. Other catalysts can be used, such as benzoyl peroxide, acetyl peroxide, acetyl benzoyl peroxide, lauryl peroxide, tertiary butyl perbenzonate, acetone peroxide, etc., if they form part of the well known redox systems of polymerization catalyzers, especially when operating at below about 35° C. Suitable catalyst systems are also combinations of oxygen and salts of sulfurous acid. Furthermore, chain stoppers or chain transfer agents like lauryl mercaptan may be present with the polymerization catalyst, if desired.

As pointed out before, an emulsifying agent is present in the aqueous phase. For this purpose, any of the emulsifiers used in known processes are suitable whether their action be ionic or non-ionic. Thus there may be used such emulsifiers as sodium and/or potassium myristate, laurate, palmitate, oleate, stearate, rosinate and/or hydroabietate; or alkali metal alkyl or alkylene sulphates or sulphonates such as sodium and/or potassium lauryl sulphate, cetyl sulphate, oleyl sulphonate, stearyl sulphonate, sulphonated Turkey Red oil, sulphonated mineral oils, etc. as well as ammonium or ethanolamine salts thereof; salts of higher amines like lauryl amine, hydrochloride or stearyl amine hydrobromide; and also non-ionic emulsifiers such as described in U. S. 2,322,820. In all cases, it is preferred that the hydrocarbon radical of the emulsifying agent contain 10 to 20 carbon atoms. Various percentages of emulsifying agent can be successfully used. Best results are obtained when sufficient amount is present in the aqueous medium that the suspension of polymer is substantially stable. Larger amounts may be used, but are wasteful. The limits of the preferred amount vary with the particular emulsifying agent, the monomer or mixture of monomers being polymerized, and the extent of polymerization, i. e. the ultimate concentration of polymer in the aqueous medium. In general, the concentration of emulsifying agent falls within the range of about 0.05 to 2% of the aqueous medium. Although non-ionic emulsifiers are suitable for use, it is preferred to employ an ion-active emulsifying agent.

With an ion-active emulsifier, there is employed in general between 0.01 and 0.2, particularly between 0.02 and 0.06 gram equivalents of emulsifier per kilogram of polymer ultimately present in dispersion. A gram equivalent is a number of grammes which is equal to the molecular weight divided by the number of positive (or negative) elementary electric charges formed on ionisation of a molecule. Thus in using sodium cetyl sulphonate as emulsifying agent for production of an aqueous dispersion containing 20% polymer, there is used a starting aqueous medium containing about 0.08 to 1.6%, particularly 0.16 to 0.5% of the emulsifying agent.

Stability of the polymer suspension to be prepared is achieved in the process of the invention by concentrations of the emulgators considerably lower than required for stability of the polymer suspension in known processes. In the polymerization of vinylidene compounds according to the invention, using a non glass-lined stainless steel reactor and sulphonated aliphatic compounds with 10-20 carbon atoms in the molecule as emulsifiers, as little as 0.04 gram equivalents of the emulsifier is sufficient to avoid any polymer deposit. This is the more remarkable since direct contact of a polymer suspension with a metal wall generally promotes the formation of polymer deposits.

Although the temperature of operation in the polymerizing zone can vary during the course of the polymerization, it is preferred to maintain it substantially constant, and as explained before, this is conveniently accomplished by cooling the circulating monomer phase. However, in starting up the polymerization, it may be necessary to apply heat until the polymerization reaction is under way. Once polymerization has started, the temperature is kept constant by cooling, since the polymerization reaction is exothermic. A broad range of temperature is suitable for conducting the polymerization, but in general temperatures of about $-20°$ C to $90°$ C. are used, and very good results are obtained with the aqueous medium at about $15°$ C. to $70°$ C.

Since the process operates with liquid monomer, at least sufficient pressure is employed to achieve this state. In cases where the operating temperature is below the boiling point of the monomer, ordinary atmospheric pressure may be used. With operations at temperatures above the boiling point, it is, of course, necessary that sufficient superatmospheric pressure be used that the monomer is liquid, as is the case, for example, in polymerizing vinyl chloride at $25°$ C. High excesses of pressure may be used if desired.

The presence of oxygen generally tends to inhibit the rate of polymerization and, therefore, the reaction medium is preferably kept out of contact with oxygen by use of a closed apparatus and the reactor is purged free of oxygen in starting up.

The polymer product obtained as an aqueous dispersion may be separated from the aqueous medium by any of the well known coagulation procedures. Since the formed polymer dispersion is very stable, it is a useful product itself which may be stored and/or transported over extended periods of time for use in cloth coating operations, for example.

Apart from the preparation of homopolymers, the process of the invention is also very suitable for copolymerization. By this is meant the joint polymerization of two or more monomers. The invention renders it easy to conduct a copolymerization in such a manner that a homogeneous copolymer is formed—i. e. a copolymer consisting of macro-molecules, all composed of monomer molecules in one and the same ratio.

In general different monomers, though they are present in the same concentration, are used up at different speeds in a copolymerization. The ratio in which monomers are present in the reaction mixture consequently shows a tendency to change. An alteration in the ratio of the monomer concentration in the reaction mixture in turn results in the composition of the macromolecules formed being subject to alteration, so that the copolymer becomes what is called heterogeneous.

It is known that in order to obtain homogeneous copolymer, the ratio of the monomers in the reaction mixture must be kept constant, which can best be attained by admixing suitable quantities of all participating monomers, or by admixing suitable quantities of all monomers with the exception of the monomer which in proportion to the total quantity of that particular monomer present, is consumed most slowly. In the process according to the invention, this admixture can take place most efficiently in the monomer circulation line. Preferably a reservoir will be fitted in the circulation line in this case. The admixture of monomer then takes place preferably in this reservoir or in the part of the circulation line in front of the reservoir. When applying a reservoir the monomer can be admixed both continuously and intermittently.

For elucidation reference is made to Fig. III. In column-shaped reaction space 18, there is aqueous phase 19, over which there is a layer of separated monomer mixture 20. It is assumed that the monomer mixture is lighter than the aqueous phase. The aqueous phase is fed via conduit 21 by pump 22 and drained by conduit 23. The monomer mixture is conducted via circulation line 24 from the separated layer 20 to distributing device 25. Circulation line 24 apart from pump 26 contains reservoir 27, to which fresh monomer is fed by dosing pump 29 and conduit 28.

The apparatus shown in Fig. III can also be used in applying the process according to the invention in a case where a certain batch of monomer is converted into polymer or copolymer. If in this case one desires to obtain a homogeneous copolymer one will first introduce into reservoir 27 part of the quantity of monomers to be converted into copolymer, seeing to it that the ratio is the same as that which yields macromolecules of the desired composition in copolymerization. As copolymerization progresses the composition of the mixture in the reservoir will be kept constant by admixing the monomer that was originally kept back.

Heterogeneous copolymers (copolymers the macromolecules of which are not composed of monomer molecules in the same ratio) can be prepared according to the invention by introducing into the reservoir the whole charge of the monomer to be converted and not correcting the ratio of the monomers during copolymerization. It is also possible to prepare heterogeneous copolymers of a determined desired composition by altering the composition of the monomer mixture during copolymerization in a predetermined manner by admixing certain monomers in certain quantities. This alteration can be made suddenly or gradually.

In the following manner heterogeneous copolymers can be obtained continuously. One chooses the various dimensions in such a manner that the reservoir is large having regard to the volume of the monomer in the circuit outside the reservoir. Whenever the contents of the reservoir have been practically consumed fresh monomer mixture is admixed batchwise, the quantity and composition of the monomer mixture in the reservoir being reverted to the original values. The copolymers thus obtained are of practically the same composition as those that are prepared batchwise.

By means of the circulation line, particularly when it comprises the said reservoir, the process according to the invention can be controlled easily. In the case of copolymerization the composition of the circulating monomer mixture can be controlled by measuring a measurable physical property. For this purpose, the refractive index, specific gravity or any other measurable physical property can be used. The admixture of monomer in the course of the copolymerization can be regulated on the strength of the readings of the measuring instruments by which the composition of the monomer mixture is controlled. If desired, the admixture of monomer can be made fully automatic by response to readings of the said measuring apparatus.

The monomer flow can be conducted in succession through two or more reactors. In this way only a single circulation pump is needed to serve two reactors. Instead of being connected in series, the reactors can be connected in parallel with regard to the monomer flow, the monomer flow leaving the reservoir dividing and the various branchings going through the different reactors, subsequently to reunite. Series connection of the reactors is also possible with regard to a flowing water phase.

A diagram in which the circulating monomer flow successively passes two reactors and moreover is washed with water is shown in Fig. IV. Here the monomer is presumed to be heavier than water. It is conducted by pump 32 from reservoir 30 to reactor 33 through conduit 31, passes in drops through water phase 34 to the wider part 35, where it separates from the water phase; subsequently it passes through conduit 36 to reactor 37, after which it goes to washing column 39 via conduit 38, whilst finally it returns to reservoir 30 via conduit 40 after the water has been separated from it. The water phase is supplied through line 41 by pump 42 divides into the two reactors 33 and 37 and leaves them via conduits 43 and 44, which unite to form conduit 45. The washing water is supplied through conduit 46 by pump 47, enters washing column 39 and leaves it through conduit 48. Monomer may be fed to reservoir 30 by pump 50, via conduit 49. The separating surface of water phase and monomer in both reactors and in the washing column can automatically be kept at the desired level by adjusting mechanisms 51, which regulate valves in lines 43, 44 and 48.

Results obtained with operation of the process of the invention are illustrated in the following examples wherein the percentages are by weight.

Example 1.—Polymerization of vinylidene chloride

The apparatus consisted of a vertically arranged glass tube of a length of 60 cm. and a diameter of 3.5 cm. that was closed at each end with a bored stopper. The neck of a drop funnel was passed through the opening of the top stopper, and a narrow glass tube with an internal diameter of 5 mm. went through the opening in the bottom stopper, conducting back to the drop funnel via a pump outside the former tube.

The former tube was three quarters filled with a solution of 0.6% sodium mersolate, 0.5% potassium persulphate and 0.2% sodium bicarbonate in water. Subsequently vinylidene chloride was admitted from the drop funnel at room temperature, and it collected as a separate layer in the bottom part of the tube. When the tube had been wholly filled in this manner the pump was put into action.

The sodium mersolate used in this and the other examples as emulsifying agent was a mixture of sodium alkyl sulphonates obtained by sulphochlorination of a mixture of saturated hydrocarbons, the constituents of which were predominantly paraffinc in character and contain about 12 to 18 carbon atoms with an average number of about 15, followed by saponification of the resulting sulphochlorides with sodium hydroxide.

At first the diameter of the monomer drops in the water phase was smaller than 1 mm. and there was a layer of concentrated emulsion of a thickness of 1 to 2 cm. on the monomer which had separated in the bottom section of the tube. To prevent growth of this layer of concentrated emulsion, the rate of throughput of the monomer was first kept at a value not exceeding 3 litres per hour.

The diameter of the monomer drops increased gradually, which is explained by the binding of emulsifier to the polymer particles formed. When about 1% polymer had been formed (calculated on the water phase) the diameter of the drop had increased to a value of 0.5 to 1 cm. and the thickness of the layer of concentrated emulsion had reduced to a few millimeters. The rate of throughput of the vinylidene chloride could then readily be increased to 12 litres per hour.

The process was continued until the water phase contained 10% polymer. The temperature was 18° C. The rate of formation of the polymer averaged 10 grams per litre of water phase per hour. The particle size of the polymer was less than 0.2 mu. There was no separation of polymer from the suspension.

Example 2.—Polymerization of vinyl chloride

The polymerization was carried out in a vertically arranged thick-walled glass tube, the length of which was 60 cm. and the inside diameter 3.5 cm., and the ends of which were provided with perforated metal seals. The bottom seal was fitted with an upward directing nozzle with an internal diameter of 6 mm. The top and bottom ends of the tube were connected by 3 mm. diameter metal conduits to a cylinder filled with liquid vinyl chloride. The feed line entering the bottom part of the tube was provided with a plunger pump. The discharge line conducting back from the top of the tube to the cylinder was provided with a pressure valve.

The tube was three quarters filled with a 10% suspension of polyvinyl chloride in water, which furthermore, calculated on the water phase, contained 0.5% sodium mersolate, 0.5% potassium persulphate and 0.2% sodium bicarbonate, and had been prepared in advance.

The tube was placed in a heating bath, by which the temperature of the suspension could be kept at 45° C. The cylinder was at a temperature of 25° C.

Vinyl chloride was pumped into the tube; it rose into the water phase in drops of 0.5 to 1 cm. diameter and separated off on top of the water phase. The rate of separation was such that the throughput could without difficulty amount to 20 litres of liquid vinyl chloride per hour from the start.

The polymerization was continued until the concentration of the polymer had risen to 20%. The rate of formation of the polymer amounted to 20 to 25 grams per litre of water phase per hour. The particle size of the polymer was under 0.2 mu. There was no separation of polymer from the suspension.

*Example 3.—Preparation of a homogeneous copolymer of vinylidene chloride and methyl methacrylate*

Starting from a mixture of vinylidene chloride and methyl methacrylate in the weight ratio of 96:4, a copolymer was formed at a constant temperature of 30° C. The copolymer contained vinylidene chloride and methyl methacrylate in the weight ratio 90:10.

About 2.5 kilograms of the monomer mixture circulated through 800 cc. water phase which contained 0.5% sodium mersolate, 0.5% ammonium persulphate, 0.25% sodium sulphite ($Na_2SO_3$) and 0.25% sodium bicarbonate. The internal diameter of the reaction column amounted to 5 cm. The internal diameter of the nozzle through which the mixture of monomers was introduced into the column amounted to 6 mm.

The monomer mixture was heavier than the water phase and was conducted downward in the column-shaped reaction space. At first a thick layer of concentrated emulsion formed at the junction of the water phase and the monomer mixture underneath. This layer practically disappeared later. The rate of circulation could be increased to 10 to 15 litres of monomer mixture per hour.

The rate of formation of the copolymer amounted to 50 to 100 grams per litre of water phase per hour. During the copolymerization the monomer mixture was brought back hourly to approximately the original quantity and composition by addition of monomer mixture having a weight ratio of 90:10 of vinylidene chloride to methyl methacrylate. When the specific gravity of the water phase had increased to 1.10, it was further kept constant by draining off the suspension obtained and feeding fresh water phase.

A 20% suspension of the copolymer was obtained. Deposits of the copolymer did not occur. The copolymer was readily soluble in cyclohexanone.

*Example 4.—Preparation of a homogeneous copolymer of vinylidene chloride and methacrylonitrile*

Starting from a mixture of vinylidene chloride and methacrylonitrile in the weight ratio of 98.5:1.5, a homogeneous copolymer was obtained at a constant temperature of 30° C., composed of vinylidene chloride and methacrylic nitrile in the weight ratio of 95:5.

The process was carried out as described in Example 3 and in the same apparatus. The rate of formation of the copolymer amounted to 30 to 40 grams per litre of water phase per hour. The specific gravity of the suspension obtained amounted to 1.08 to 1.10.

*Example 5.—Preparation of a homogeneous copolymer of vinylidene chloride and vinyl acetate*

Starting from a mixture of vinylidene chloride and vinyl acetate in the weight ratio of 75:25, a copolymer was obtained at a constant temperature of 30° C., composed of vinylidene chloride and vinyl acetate in the weight ratio of 95:5.

About 2.5 kilos of the monomer mixture was circulated through 800 cc. water phase, containing 0.7% sodium mersolate, 0.5% ammonium persulphate, 0.25% sodium sulphite ($Na_2SO_3$) and 0.25% sodium bicarbonate. The internal diameter of the reaction column was 5 cm. The internal diameter of the nozzle through which the monomer was introduced into the reaction column amounted to 6 mm.

When the layer of emulsion which formed originally at the junction of water phase and the integral phase of the monomer mixture had practically disappeared, the throughput of the monomer mixture was kept at 10 litres per hour. When the polymer content of the water phase had increased to 16%, this concentration was kept constant by feeding in fresh water phase and draining off the suspension obtained. The quantities of monomer used during copolymerization were replenished every hour by admixing a mixture of vinylidene chloride and vinyl acetate in the weight ratio of 95:5. The rate of formation of the copolymer averaged approximately 50 grams per litre of water phase per hour. The copolymer prepared in this manner was readily soluble in cyclohexanone.

*Example 6.—Polymerization of vinyl chloride on semitechnical scale*

The reaction apparatus consisted of a vertically arranged tube of stainless steel ($V_2A$), with a height of 200 cm. and an internal diameter of 10 cm. The tube was provided with small glass windows for inspection, one near the bottom and another 160 cm. above the bottom. Both ends of the tube were closed with flanges. The bottom flange was fitted with a distribution device comprising 5 upward directing nozzles with an internal diameter of 6 mm. each. A stainless steel recirculation line connected the top of the tube through the top flange with the distribution device. In the recirculation line from top to bottom the following apparatus was arranged: a washing vessel of 20 litres capacity, a heat exchanger and a centrifugal pump. Further a stainless steel pressure vessel was present connected by a stainless steel line with the bottom of the tube through the bottom flange. The last mentioned line was fitted with a valve which opened at a pressure difference of 3 atmospheres. The pressure vessel was provided with an outlet for the polymer suspension to be produced and with an inlet for an inert gas (nitrogen), both with valves.

Before starting the polymerization the pressure vessel was filled with nitrogen to a pressure of 7 atmospheres. In the reaction tube 12 litres of an aqueous solution were put containing 1.0% sodium mersolate, 0.4% potassium persulphate and 0.3% sodium bicarbonate. The washing vessel was provided with 15 litres of water containing 0.2% sodium bicarbonate. The residual space of the apparatus (with exception of the pressure vessel) was filled with liquid vinyl chloride under a pressure of 8.5 atmospheres.

By means of the centrifugal pump the vinyl chloride was recirculated initially at a rate of 40 litres per hour. The polymerization was started by heating the contents of the system to 45° C. by introduction of steam into the heat exchanger. Thereafter the temperature was maintained at 44–45° C. by cooling with cold water in the heat exchanger. Gradually the rate of recirculation could be enhanced to 100 litres per hour, while maintaining a quick separation of the liquid vinyl chloride from the water phase in the reaction tube. The pressure of 8.5 atmospheres was maintained by regular supply of liquid vinyl chloride.

After the polymer concentration in the aqueous phase had raised to 25% by weight the process was made continuous by the following measures:

1. Regular supply of water phase of the initial composition to the reaction tube (through an inlet provided at a level 100 cm. above the bottom flange) so as to keep the concentration of polymer in the water phase in the apparatus constant at 25%;
2. Regulation of the supply of vinyl chloride so as to keep the interface between aqueous phase and integral monomer phase in the reaction tube at the level of the upper glass window; as a result of this measure the valve in the connecting line between reaction tube and pressure vessel opened, permitting the polymer suspension to flow from the tube to the pressure vessel;
3. Intermittent discharge of the polymer suspension from the pressure vessel.

This process was continued without any interruption for 10 days. The average rate of polymer formation was 90 grams per litre of water phase and per hour. The produced suspension was very stable. Not a trace of polymer deposits was found on the walls and other metal parts.

The function of the pressure vessel is to limit the pressure fluctuations which might be caused by discharging polymer suspension from the apparatus. Strong fluctuations might cause the formation of gaseous vinyl chloride bubbles in the reaction tube which would impair the separation at the interface of water phase and integral monomer phase and therefore should be avoided.

*Example 7.—Preparation of a concentrated suspension of a homogeneous copolymer of vinyl chloride and vinylidene chloride (semitechnical scale)*

The apparatus was the same as that described in Example 6.

At the beginning 12 litres of a previously prepared 40% copolymer suspension were introduced into the reaction tube. This copolymer was constituted from vinyl chloride and vinylidene chloride in the relative proportion of 20:80 by weight. It was not a homogeneous copolymer. The suspension of this copolymer had been prepared previously by a conventional method in batch.

The constitution of the aqueous phase was: 2.0% sodium mersolate, 0.4% potassium persulphate, 0.2% sodium bicarbonate and 97.3% water.

In the washing vesesl 15 litres of a 0.2% sodium bicarbonate solution were introduced.

The remaining space was filled with a mixture of vinyl chloride and vinylidene chloride in the relative proportion of 57:43 by weight, under a pressure of 7.5 atmospheres.

During the polymerization a mixture of vinyl chloride and vinylidene chloride in the relative proportion of 27:73 by weight was supplied. The water phase supplied during the polymerization contained 2.0% sodium mersolate, 0.4% potassium persulphate and 0.3% sodium bicarbonate.

The water phase was supplied at such a rate that the concentration of copolymer in the suspension in the tube at 40–45%. The mixture of monomers was supplied at such a rate that the pressure of 7.5 atmospheres was maintained.

Further the procedure was completely in analogy with Example 6. The suspension of copolymer initially present was gradually replaced by a suspension of freshly formed homogeneous copolymer. The average rate of copolymer formation was 90 grams per litre water phase and per hour.

The product was a very stable suspension of a copolymer constituted from vinyl chloride and vinylidene chloride in the relative proportion of 27:73 by weight.

*Example 8.—Polymerization of butadiene on semi-technical scale*

The apparatus was the same as that of Example 6 but the pressure vessel and the valved line connecting the reaction tube with it were dispensed with. The reaction tube was provided instead with a discharge line fitted with a valve which remained closed throughout the experiment.

Before the start 12 litres of an aqueous solution, containing 0.5% potassium oleate and 0.4% potassium persulphate, to which solution so much sodium hydroxide had been added that the pH amount to 10.1, were introduced into the reaction tube. In the washing vessel 15 litres of a 0.2% sodium bicarbonate solution were introduced. The remaining space was filled up with butadiene which had been purified by rectification and to which 0.5% by weight of tertiary dodecyl mercaptan had been added.

The butadiene was recirculated with a rate of 25 litres per hour. The polymerization reaction was started by heating the system to 55° C. by introduction of steam in the heat exchanger. After the polymerization had started the rate of circulation was gradually raised to 60 litres per hour; the temperature was brought and maintained at 50° C. by introduction of cold water into the heat exchanger.

During the polymerization the apparatus was kept completely filled with liquid by supply of about 1½ litre of butadiene.

The experiment was continued until the polymer concentration in the aqueous phase had risen to 20% by weight. The average rate of polymer formation amounted to 40 grams per litre of water phase and per hour. No trace of polymer deposits was noticed on the walls and other metal parts.

*Example 9.—Copolymerization of butadiene and styrene on semi-technical scale*

Apparatus and procedure were completely the same as in Example 8, but for the difference that instead of butadiene a mixture of butadiene and styrene in the relative proportion of 75:25 by weight was used. The quantity of tertiary dodecyl mercaptan initially added amounted to 0.5% by weight calculated on the mixture of monomers.

A stable 20% copolymer suspension was prepared. No deposit of polymer was noticed.

We claim as our invention:

1. A process for producing polymer of an olefinically unsaturated compound which comprises introducing drops of monomer of the olefinically unsaturated compound which is substantially not or only partially miscible with water, into submerged contact with a liquid aqueous medium maintained at polymer-producing temperature and containing a water-soluble radical-yielding polymerization catalyst and dispersed polymer of sa. olefinically unsaturated compound suspended therein by the presence of sufficient emulsifying agent that the polymer emulsion is substantially stable, conducting the drops through said aqueous medium while in contact therewith while maintaining the rate of introduction of said monomer drops such that the majority of the introduced monomer passes clear through the aqueous medium in-monomeric form., the movement of said drops therethrough being effected primarily by the difference in density of said monomer drops and the medium, and collecting the drops of monomeric olefinically unsaturated compound which have passed through the aqueous medium into an integral monomer liquid layer which is maintained in contact with the aqueous medium.

2. A process for producing copolymer which comprises flowing drops of a monomeric mixture of different olefinically unsaturated compounds which are not or only partially miscible with water, into submerged contact with a liquid aqueous medium at polymer-producing temperature for said mixture, said aqueous medium containing a water-soluble radical-yielding polymerization catalyst and dispersed copolymer of said olefinically unsaturated compounds suspended therein by the presence of sufficient emulsifying agent that the copolymer emulsion is substantially stable, conducting said submerged drops through said aqueous medium while maintaining the rate of introduction of said monomer drops such that the majority of the introduced monomer passes clear through the aqueous medium in monomeric form, the movement of said drops being effected by a difference in density of said drops and the aqueous medium, and collecting the drops of monomeric olefinically unsaturated compounds which have passed through the aqueous phase into an integral monomer liquid phase which is maintained in contact with the aqueous medium.

3. A process according to the method defined in claim 2 wherein the monomeric mixture contains butadiene-1,3 and styrene.

4. A process according to the method defined in claim 3 wherein the monomeric mixture contains 60% to 90% by weight of butadiene-1,3, the remainder being styrene.

5. A process according to the method defined in claim 2 wherein the monomeric mixture contains 60% to 99% by weight of butadiene-1,3, the remainder being acrylonitrile.

6. A process for producing polymer of a vinylidene compound which comprises flowing drops of the vinylidene compound into submerged contact with an elongated vertical column of a liquid aqueous phase in a polymerizing zone with the aqueous phase at polymer-producing temperature for said vinylidene compound, said aqueous phase containing a water-soluble persulphate salt and dispersed polymer of said vinylidene compound suspended therein by the presence of sufficient emulsifying agent that the polymer emulsion is substantially stable; conducting said drops through said column of aqueous phase while maintaining a rate of introduction of the drops into said contact therewith such that at least 90% of the introduced monomer passes clear through the aqueous phase in monomeric form, the movement of the drops through the aqueous phase being effected by a difference in density of said drops and the aqueous phase, and said aqueous phase being free of agitation other than that induced by said moving drops and the liquids flowing in and out of the polymerizing zone; withdrawing such a proportion of the aqueous phase from the polymerizing zone that the rate of polymer withdrawal is substantially the same as the rate of production of said polymer in the aqueous phase, and introducing into the aqueous phase in the polymerizing zone such amounts of water along with such quantities of said persulphate salt and said emulsifying agent that the volume of aqueous phase in the polymerizing zone and the concentrations of said persulphate salt and said emulsifying agent are maintained substantially constant; collecting the drops of monomeric vinylidene compound which have passed clear through the aqueous phase in the polymerizing zone into an integral liquid monomer phase which is maintained in contact with said aqueous phase; withdrawing such a proportion of said vinylidene compound from said liquid monomer phase that the volume of said monomer phase is maintained substantially constant; and circulating said withdrawn vinylidene compound with introduction of the same again as drops into submerged contact with the aqueous phase in the polymerizing zone along with such an additional amount of said vinylidene compound that it is substantially the same as the amount of polymeric vinylidene compound being removed in the aqueous phase withdrawn from the polymerizing zone.

7. A process as defined in claim 6 wherein the circulating vinylidene compound is cooled prior to re-introduction as drops in submerged contact with the aqueous phase in the polymerizing zone, the extent of said cooling being such that the temperature of said phase is maintained substantially constant.

8. A process as defined in claim 6 wherein the circulating vinylidene compound is first subjected to water washing and then is cooled prior to re-introduction as drops in submerged contact with the aqueous phase in the polymerizing zone, the extent of said cooling being such that the temperature of said aqueous phase is maintained substantially constant.

9. A process as defined in claim 6 wherein the vinylidene compound is vinyl chloride.

10. A process as defined in claim 6 wherein the vinylidene compound is vinylidene chloride.

11. A process as defined in claim 6 wherein the vinylidene compound is butadiene-1,3 and has styrene mixed therewith in a proportion of about 1:9 to 4:6 parts by weight of styrene to butadiene-1,3.

12. A process as defined in claim 2 for the production of homogeneous copolymers in which the initial ratio in which the monomers are present is re-established continuously or intermittently.

13. A process as defined in claim 2 for the continuous production of heterogeneous copolymers in which the intial ratio and initial quantity in which the monomers are present are re-established intermittently and each time after a substantial part of the circulating monomers has been used up.

14. A process as defined in claim 2 in which the monomer is introduced into the aqueous phase at a linear speed of at most 30 cm. per second.

15. A process for producing polymer of an olefinically unsaturated compound which is not or only partially miscible with water, which comprises continuously introducing drops of the olefinically unsaturated compound into submerged contact with a column of a liquid aqueous medium at polymer-producing temperature for said olefinically unsaturated compound, said aqueous medium containing a water-soluble radical-yielding polymerization catalyst and dispersed polymer of said olefinically unsaturated compound suspended therein by the presence of sufficient amount of an emulsifying agent that the polymer suspension is substantially stable; conducting said drops through said column of aqueous medium while maintaining the rate of introduction of said monomer drops such that the majority of the introduced monomer passes clear through the aqueous medium in monomeric form, the movement of the drops through said aqueous medium being effected primarily by the difference in density of said drops and the medium, which medium is free of mechanically induced agitation; continuously collecting the drops of monomeric olefinically unsaturated compound which have passed through the aqueous medium into an integral monomer liquid phase which is maintained in contact with the aqueous medium; and continuously feeding water, said water-soluble radical-yielding polymerization catalyst and said emulsifying agent into the aqueous medium while continuously withdrawing a portion of the aqueous medium from the reaction zone, the rates of feed and withdrawal being maintained substantially the same.

16. A process for producing polymer of an olefinically unsaturated compound which is not or only partially miscible with water, which comprises continuously introducing drops of the olefinically unsaturated compound into submerged contact with a column of a liquid aqueous medium at polymer-producing temperature for said olefinically unsaturated compound, said aqueous medium containing a water-soluble radical-yielding polymerization catalyst and dispersed polymer of said olefinically unsaturated compound suspended therein by the presence of sufficient amount of an emulsifying agent that the polymer suspension is substantially stable; conducting said drops through said column of aqueous medium while maintaining the rate of introduction of said monomer drops such that the majority of the introduced monomer passes clear through the aqueous medium in monomeric form, the movement of the drops through said aqueous medium being effected primarily by the difference in density of said drops and the medium, which medium is free of mechanically induced agitation; continuously collecting the drops of monomeric olefinically unsaturated compound which have passed through the aqueous medium into an integral monomer liquid phase which is maintained in contact with the aqueous medium; and continuously circulating said olefinically unsaturated compound from the integral monomer phase and reintroducing this circulating compound as drops into submerged contact with the column of aqueous medium.

17. A process for producing polymer of an olefinically unsaturated compound which is not or only partially miscible with water, which comprises continuously introducing drops of the olefinically unsaturated compound into submerged contact with a column of a liquid aqueous medium at polymer-producing temperature for said olefinically unsaturated compound, said aqueous medium containing a water-soluble radical-yielding polymerization catalyst and dispersed polymer of said olefinically unsaturated compound suspended therein by the presence of sufficient amount of an emulsifying agent with the polymer suspension is substantially stable; conducting said drops through said column of aqueous medium while maintaining the rate of introduction of said monomer drops such that the majority of the introduced monomer passes clear through the aqueous medium in monomeric form, the movement of the drops through said aqueous medium being effected primarily by the difference in density of said drops and the medium, which medium is free of mechanically induced agitation; continuously collecting the drops of monomeric olefinically unsaturated compound which have passed through the aqueous medium into an integral monomer liquid phase which is maintained in contact with the aqueous medium; continuously withdrawing said olefinically unsaturated compound from the integral monomer phase; continuously subjecting the withdrawn compound to cooling; and continuously reintroducing the cooled compound as drops into submerged contact with the column of aqueous medium.

18. A process for producing polymer of a vinylidene compound which is not or only partially miscible with water, which comprises continuously introducing drops of the vinylidene compound into submerged contact with a column of a liquid aqueous medium at polymer-producing temperature for said vinylidene compound, said aqueous medium containing a water-soluble radical-yielding polymerization catalyst and dispersed polymer of said vinylidene compound suspended therein by the presence of sufficient amount of an emulsifying agent that the polymer suspension is substantially stable; conducting said drops through said column of aqueous medium while maintaining the rate of introduction of said monomer drops such that the majority of the introduced monomer passes clear through the aqueous medium in monomeric form, the movement of the drops through said aqueous medium being effected primarily by the difference in density of said drops and the medium, which medium is free of mechanically induced agitation; and continuously collecting the drops of monomeric vinylidene compound which have passed through the aqueous medium into an integral monomer liquid phase which is maintained in contact with the aqueous medium.

19. A process for producing polymer of vinyl chloride which comprises continuously introducing drops of vinyl chloride into submerged contact with a column of a liquid aqueous medium at polymer-producing temperature for the vinyl chloride, said aqueous medium containing a water-soluble radical-yielding polymerization catalyst and dispersed polymer of vinyl chloride suspended therein by the presence of sufficient amount of an emulsifying agent that the polymer suspension is substantially stable; conducting said drops through said column of aqueous medium while maintaining the rate of introduction of said monomer drops such that the majority of the introduced monomer passes clear through the aqueous medium in monomeric form, the movement of the drops through said aqueous medium being effected primarily by the difference in density of said drops and the medium, which medium is free of mechanically induced agitation; and continuously collecting the drops of monomeric vinyl chloride which have passed through the aqueous medium into an integral monomer liquid phase which is maintained in contact with the aqueous medium.

20. A process for producing polymer of vinylidene chloride which comprises continuously introducing drops of vinylidene chloride into submerged contact with a column of a liquid aqueous medium at polymer-producing temperature for the vinylidene chloride, said aqueous medium containing a water-soluble radical-yielding polymerization catalyst and dispersed polymer of vinylidene chloride suspended therein by the presence of sufficient amount of an emulsifying agent that the polymer suspension is substantially stable; conducting said drops through said column of aqueous medium while maintaining the rate of introduction of said monomer drops such that the majority of the introduced monomer passes clear through the aqueous medium in monomeric form, the movement of the drops through said aqueous medium being effected primarily by the difference in density of said drops and the medium, which medium is free of mechanically induced agitation; and continuously collecting the drops of monomeric vinylidene chloride which have passed through the aqueous medium into an integral monomer liquid phase which is maintained in contact with the aqueous medium.

21. A process for producing polymer of butadiene-1,3 which comprises continuously introducing drops of butadiene-1,3 into submerged contact with a column of a liquid aqueous medium at polymer-producing temperature for the butadiene-1,3, said aqueous medium containing a water-soluble radical-yielding polymerization catalyst and dispersed polymer of butadiene-1,3 suspended therein by the presence of sufficient amount of an emulsifying agent that the polymer suspension is substantially stable; conducting said drops through said column of aqueous medium while maintaining the rate of introduction of said monomer drops such that the majority of the introduced monomer passes clear through the aqueous medium in monomeric form, the movement of the drops through said aqueous medium being effected primarily by the difference in density of said drops and the medium, which medium is free of mechanically induced agitation; and continuously collecting the drops of monomeric butadiene-1,3 which have passed through the aqueous medium into an integral monomer liquid phase which is maintained in contact with the aqueous medium.

22. A process for producing polymer of styrene which comprises continuously introducing drops of styrene into submerged contact with a column of a liquid aqueous medium at polymer-producing temperature for the styrene, said aqueous medium containing a water-soluble radical-yielding polymerization catalyst and dispersed polymer of styrene suspended therein by the presence of sufficient amount of an emulsifying agent that the polymer suspension is substantially stable; conducting said drops through said column of aqueous medium while maintaining the rate of introduction of said monomer drops such that the majority of the introduced monomer passes clear through the aqueous medium in monomeric form, the movement of the drops through said aqueous medium being effected primarily by the difference in density of said drops and the medium, which medium is free of mechanically induced agitation; and continuously collecting the drops of monomeric styrene which have passed through the aqueous medium into an integral monomer liquid phase which is maintained in contact with the aqueous medium.

23. A process for producing polymer of a vinylidene compound which is not or only partially miscible with water, which comprises continuously introducing drops of the vinylidene compound into submerged contact with a column of a liquid aqueous medium at polymer-producing temperature for said vinylidene compound, said aqueous medium containing a water-soluble radical-yielding polymerization catalyst and dispersed polymer of said vinylidene compound suspended therein by the presence of sufficient amount of an emulsifying agent that the polymer suspension is substantially stable; conducting said drops through said column of aqueous medium while maintaining the rate of introduction of said monomer drops such that the majority of the introduced monomer passes clear through the aqueous medium in monomeric form, the movement of the drops through said aqueous medium being effected primarily by the difference in density of said drops and the medium, which medium is free of mechanically induced agitation; and continuously collecting the drops of monomeric vinylidene compound which have passed through the aqueous medium into an integral monomer liquid phase which is maintained in contact with the aqueous medium, the monomer of said vinylidene compound being introduced into the aqueous phase at a linear speed of at most 12 cm. per second.

CHRISTIAAN PIETER VAN DIJK.
FRANCISCUS JOHANNES
FREDERICUS VAN DER PLAS.

REFERENCES CITED

The following references are of record in the file of this patent:

UNITED STATES PATENTS

| Number | Name | Date |
|---|---|---|
| 2,179,040 | Hever | Nov. 7, 1939 |
| 2,326,326 | Breedis | Aug. 10, 1943 |